UNITED STATES PATENT OFFICE.

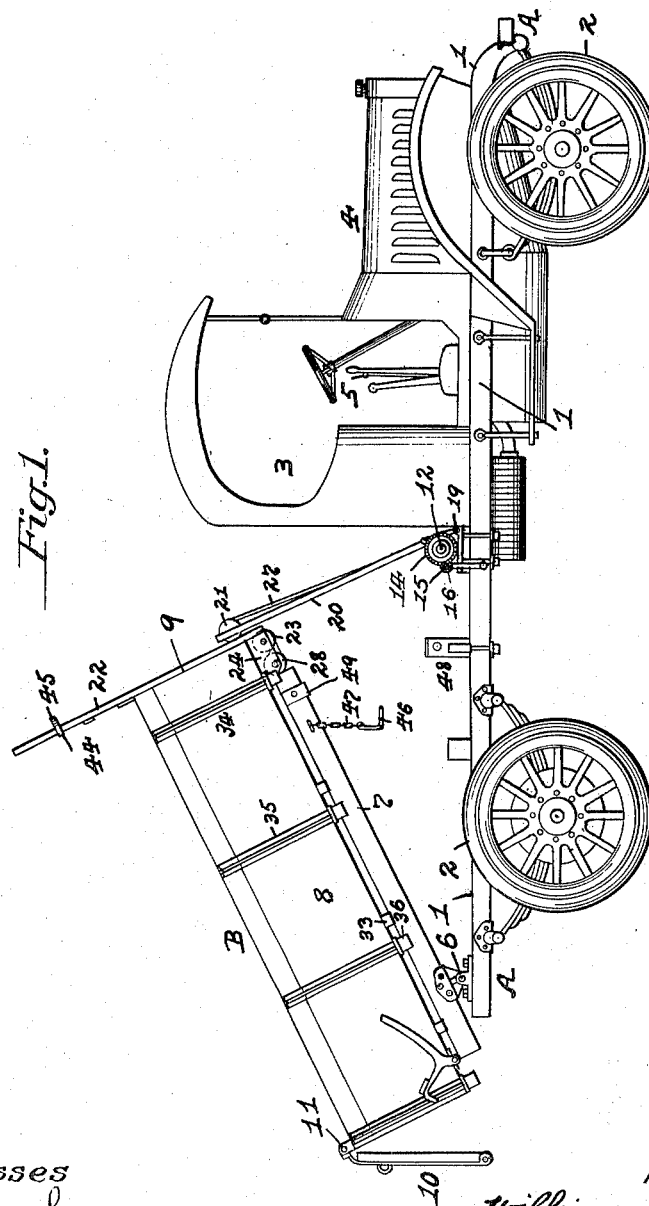

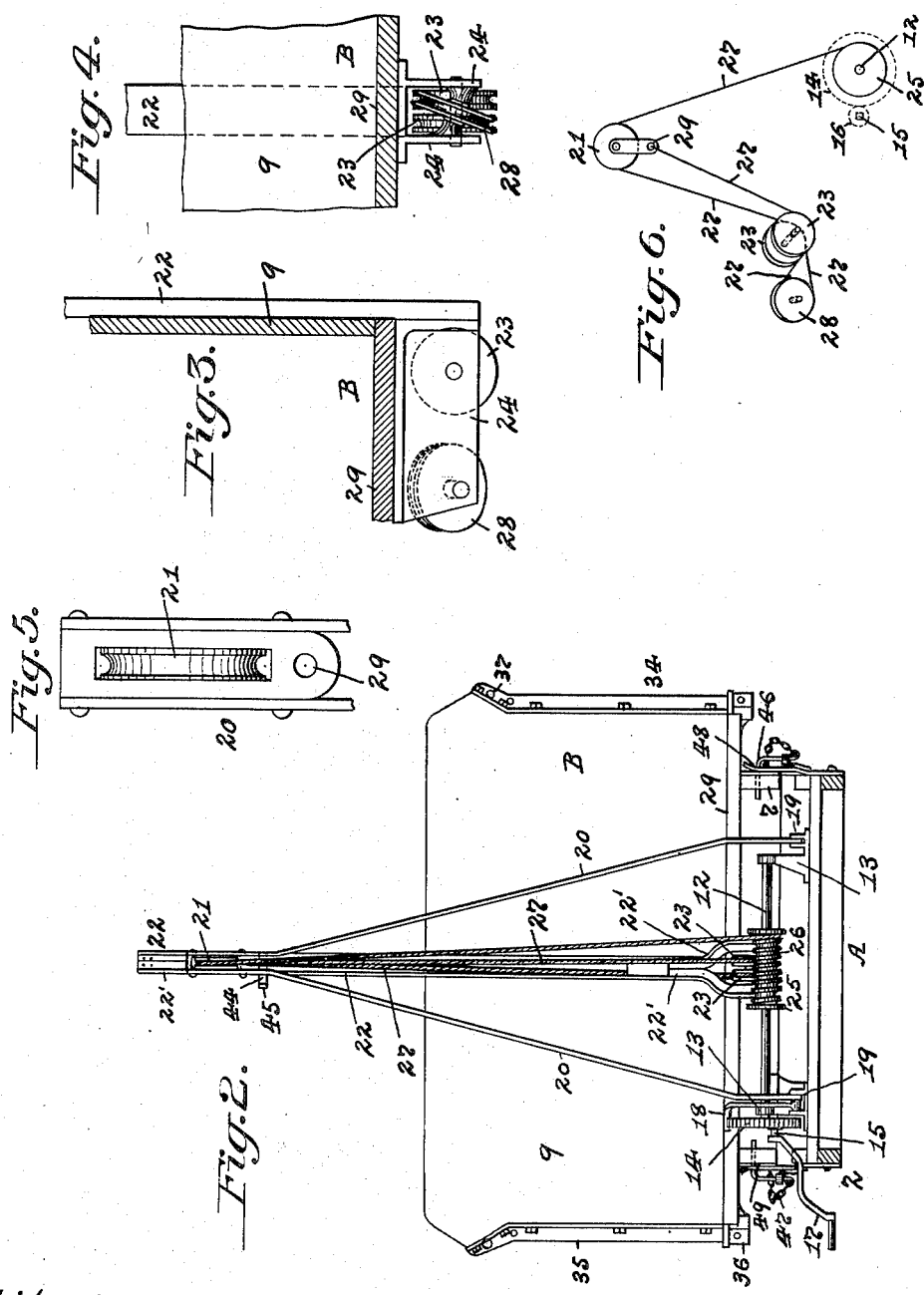

WILLIAM G. MAYER, OF PITTSBURGH, PENNSYLVANIA.

TRUCK.

1,315,523. Specification of Letters Patent. Patented Sept. 9, 1919.

Application filed November 2, 1918. Serial No. 260,869.

*To all whom it may concern:*

Be it known that I, WILLIAM G. MAYER, a citizen of the United States, and resident of Pittsburgh, in the county of Allegheny and State of Pennsylvania, have invented a new and useful Improvement in Trucks; and I do hereby declare the following to be a full, clear, and exact description thereof.

My invention relates to vehicles, and has special reference to what are known as motor vehicle trucks.

One of the objects of my invention is to provide a cheap, simple and efficient apparatus for use in connection with vehicles having dumping bodies in which the body of the truck is dumped through a hand operating mechanism by lifting the front end of the body.

Another object of my invention is to provide a cheap, simple and efficient device for connecting the sides of the body and under frame of same together.

Various other objects, such as durability, convenience, easy to manufacture and general improvement in the art, will be brought out in the following specification and illustrated in the accompanying drawings.

To these ends, my invention consists, generally stated, in the novel arrangement, construction and combination of parts, as hereinafter more specifically set forth and described and particularly pointed out in the claims.

To enable others skilled in the art to which my invention appertains to construct and use my improved vehicle, I will describe the same more fully, referring to the accompanying drawings, in which:

Figure 1 is a side elevation of a motor vehicle truck having my invention applied thereto and showing the body in the dumping position;

Fig. 2 is a front view of the truck body, showing the dumping mechanism;

Figs. 3 and 4 are detail views of portions of the dumping mechanism;

Fig. 5 is a detail view showing a portion of the boom;

Fig. 6 is a diagrammatical view showing the cable arrangement of the dumping mechanism.

Like symbols of reference herein indicate like parts in each of the figures of the drawings.

As illustrated in the drawings A designates the chassis of the ordinary motor vehicle truck, as a whole, and which comprises the usual frame 1, wheels 2, cab 3, engine casing 4 and operating parts 5 located in such cab.

Pivotally mounted at 6 on the frame 1 of the chassis A is the body B, which has a base or under frame 7, sides 8 and front 9. The usual end gate 10 is placed at the rear end of such body A for closing the same and as shown is hinged at the upper end 11 of such body, although it may be hinged at the bottom of the body, if desired, and operated in any suitable manner for opening and closing the same, as desired.

The body portion B is adapted to be raised into a dumping or inclined position by lifting the forward end on its pivot 6 through the medium of a suitably arranged mechanism, which comprises a main shaft 12 journaled in bearings 13 on the frame 2 and having a gear wheel 14 thereon. A shaft 15 is journaled at one end in one of the bearings 13 and carries a pinion 16, and such shaft has its opposite end provided with a crank 17 for operating the same. Mounted on one of the bearings 13 is a dog or ratchet pawl 18, which is adapted to normally engage the gear wheel 14 and prevent the reverse movement of said gear wheel in the usual manner.

Pivotally mounted in the bearings 19 on the frame 2 is the boom 20 which extends upward from said frame and is provided with a pulley or sheave 21 at its upper end.

Secured on the front end 9 of the body portion B is a track portion 22, which is of channel shape, by being composed of two angle irons 22' connected together, and having their lower ends opened or flared apart to form a space or clearance for the double sheaves 23, which are journaled in bearings 24 under said body portion and adjacent said front end thereof. This track portion 22 provides for the boom 20 to travel upon the same by reason of the pivotal mounting of said boom on said track and is adapted to be guided by the side flanges on the angle irons 22'.

A drum 25 having its exterior surface provided with the grooves 26 for the reception of a cable 27 is mounted on the main shaft 12 and one end of said cable is secured to said drum. This cable 27 is trained upwardly from the drum 25 over the sheave 21 and the boom 20 and under one of the double sheaves 23, and thence under the sheave 28. This sheave 28 is mounted in the bearings 24 under the body B and in the rear of the sheaves 23, and such sheave 28 is journaled at an angle in such bearings, so that after the cable 27 passes under one of the sheaves 23 it passes over the sheave 28 and from under the same under the other sheave 23, and thence upwardly to and secured in the eye 29 on the boom 20.

In the operation of raising the body B, the crank 17 is placed in position on the end of the shaft 15, and then such crank is turned in the proper direction, which will thus operate the pinion 16 and gear wheel 14 meshing therewith and thus operate or turn the shaft 12. The drum 25 being secured to the main shaft 12 is thus rotated and the cable 27 will be wound up on the same, thereby causing a lifting action on the sheaves 23, due to such cable being drawn over the sheave 21 on the boom 20 and over the sheave 28, and thus raising the front portion of the body B on its pivot 6, so that the rear end of such body will be dropped down and the body assume an inclined or dumping position.

In order to keep the boom 20 from swaying, a clip 44 having a flanged end 45 is pivoted to the channel track portion 22 for engaging the boom 20 by such end fitting around the same, such as is shown in Figs. 1 and 2, and in order to hold the body B and lock the same down onto the frame 2, as shown in Fig. 1, a locking pin 46 is hung by a chain 47 on the under frame 7 for fitting within apertures in an upwardly extending plate 48 on said frame 2 and in a plate 49 on said under frame 7 when the body is lowered down onto said frame 2.

Various other modifications, additions and changes in the design and construction of my improved vehicle may be resorted to, without departing from the spirit of the invention, or sacrificing any of its advantages.

It will thus be seen that in the use of my improved mechanism for raising the front end of the body for dumping purposes will enable this operation to be performed by an apparatus that will be convenient and easy to operate at all times, that it will be positive and rapid in its operation, and will not be liable to get out of order.

What I claim as my invention and desire to secure by Letters Patent is:—

1. In a vehicle provided with a body adapted to be tilted for dumping purposes by being pivotally mounted on a wheeled chassis, of a boom pivotally mounted on said chassis, means for exerting a lifting action on the forward end of said body to raise the same on its pivot, said means comprising a drum and operating mechanism therewith mounted on the chassis, a sheave on said boom, a double sheave mounted under the forward end of said body, a single sheave mounted under the front end of said body in the rear of the double sheave, and a cable having one end secured to said drum and trained around said sheaves and secured to said boom.

2. In a vehicle provided with a body adapted to be tilted for dumping purposes by being pivotally mounted on a wheeled chassis, of a boom pivotally mounted on said chassis and adapted to ride on a track on the front end of said body, means for exerting a lifting action on such front end to raise said body on its pivot, said means comprising a drum and mechanism on said chassis adapted to be operated by hand, a sheave on said boom, a double sheave mounted under the front end of said body, a single sheave mounted at an angle under said body in the rear of said double sheave, and a cable having one end secured to said drum and trained over said boom sheave, under one of said double sheaves, under and returned over said single sheave, under the other double sheave and secured to the upper end of said boom.

In testimony whereof I, the said WILLIAM G. MAYER, have hereunto set my hand.

WILLIAM G. MAYER.

Witnesses:
J. M. GEOGHEGAN,
J. N. COOKE.